United States Patent
Jenkins, Jr. et al.

(10) Patent No.: US 7,083,725 B2
(45) Date of Patent: *Aug. 1, 2006

(54) HINGE DOWN REFRIGERATOR WATER FILTER

(75) Inventors: James H. Jenkins, Jr., South Amana, IA (US); David J. Olberding, Cedar Rapids, IA (US); Michael J. Eveland, Cedar Rapids, IA (US); Todd E. Kniffen, Williamsburg, IA (US); John Frank Zinni, Capistrano Beach, CA (US); Timothy Mark Nugent, Venice, CA (US); Ravi Kumar Sawhney, Calabasas, CA (US)

(73) Assignee: Maytag Corporation, Newton, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/178,653

(22) Filed: Jul. 11, 2005

(65) Prior Publication Data

US 2005/0247620 A1    Nov. 10, 2005

Related U.S. Application Data

(63) Continuation of application No. 10/195,659, filed on Jul. 15, 2002.

(60) Provisional application No. 60/305,735, filed on Jul. 16, 2001.

(51) Int. Cl.
*B01D 35/02* (2006.01)

(52) U.S. Cl. ............... 210/232; 210/444; 210/175; 62/318

(58) Field of Classification Search .......... 210/444, 210/447, 454, 236, 232, 282, 175; 62/389, 62/338, 339, 318
See application file for complete search history.

(56) References Cited

U.S. PATENT DOCUMENTS

| 4,255,937 | A |   | 3/1981  | Ehrlich |
|-----------|---|---|---------|---------|
| 4,387,578 | A |   | 6/1983  | Paddock |
| 4,490,986 | A |   | 1/1985  | Paddock |
| 4,942,630 | A | * | 7/1990  | Kantor et al. ............ 4/541.2 |
| 5,083,442 | A |   | 1/1992  | Vlock |
| 5,135,645 | A |   | 8/1992  | Sklenak et al. |
| 5,397,462 | A |   | 3/1995  | Higashijima et al. |
| 5,715,699 | A |   | 2/1998  | Coates et al. |
| 5,907,958 | A |   | 6/1999  | Coates et al. |
| 5,956,967 | A |   | 9/1999  | Kim |
| 6,120,685 | A |   | 9/2000  | Carlson et al. |
| 6,303,031 | B1 |  | 10/2001 | Senner |
| 6,337,015 | B1 |  | 1/2002  | Poirier |

FOREIGN PATENT DOCUMENTS

WO    WO 200183079 A1 *  11/2001

* cited by examiner

*Primary Examiner*—Terry K. Cecil
(74) *Attorney, Agent, or Firm*—McKee, Voorhees & Sease, P.L.C.

(57) ABSTRACT

A refrigerator water filter assembly is provided in the ceiling of a refrigerator and is adapted to hinge downwardly from the ceiling for changing the filter cartridge. The cartridge is normally partially recessed within the ceiling so as to minimize the use of space in the food compartment of the refrigerator. The filter assembly includes a base mounted in the refrigerator ceiling, a manifold pivotally mounted on the base, a filter cartridge attached to the manifold, and a cover pivotally mounted on the manifold so as to be movable between open and closed positions. When the cover is opened, the filter cartridge is angled downwardly from the ceiling for easy grasping by a person for replacement of the cartridge.

17 Claims, 6 Drawing Sheets

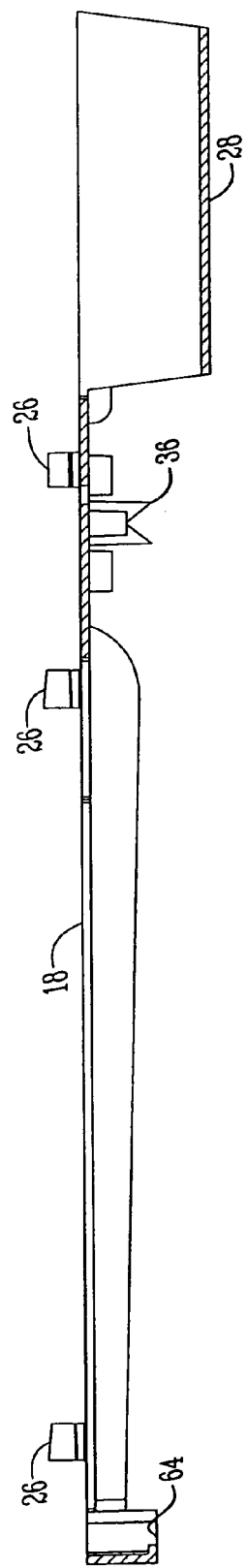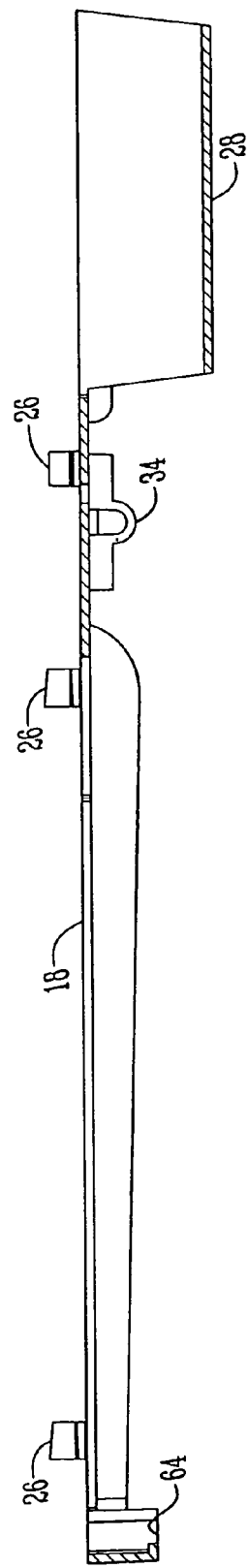

HINGE DOWN REFRIGERATOR WATER FILTER

CROSS-REFERENCE TO RELATED APPLICATIONS

This application is a continuation patent application of U.S. Ser. No. 10/195,659 filed Jul. 15, 2002 which claims priority to the U.S. provisional patent application Ser. No. 60/305,735 entitled "Hinge Down Water Filter" filed on Jul. 16, 2001.

BACKGROUND OF THE INVENTION

Refrigerators often times include water filters to treat water used to make ice cubes or dispensed from a built-in water dispenser. The filter assemblies include a manifold with a removable filter cartridge which can be replaced periodically. Prior art water filter assemblies are typically located at the bottom of the refrigerator adjacent the floor or in the rear of the fresh food compartment adjacent the ceiling. In both instances, access to the cartridge for replacement is not convenient and the cartridge may be difficult to reach for some people.

Therefore, a primary objective of the present invention is the provision of an improved water filter assembly for a refrigerator.

Another objective of the present invention is the provision of refrigerator water filter assembly which is pivotally mounted to the ceiling in the fresh food compartment.

Another objective of the present invention is the provision of a refrigerator water filter assembly wherein the filter cartridge is partially recessed into the ceiling of the fresh food compartment so as to minimize encroachment into the compartment.

A further objective of the present invention is the provision of a method of accessing the water filter cartridge in a refrigerator involving the steps of opening a filter cover to expose the filter cartridge, pivoting the filter manifold and cartridge downwardly and manually removing the cartridge from the manifold.

Still another objective of the present invention is the provision of a hinge down refrigerator water filter assembly that provides quick and easy access for replacement of the filter cartridge.

Another objective of the present invention is the provision of a refrigerator water filter assembly which is economical to manufacture and durable in use.

These and other objectives will become apparent from the following description of the invention.

SUMMARY OF THE INVENTION

A water filter assembly is provided for a refrigerator, and includes a base mounted in the ceiling of the fresh food compartment of the refrigerator, a manifold pivotally mounted in the base, a cartridge releasably mounted in the manifold, and a cover pivotally mounted to the manifold. The cover is movable between a closed position which holds the manifold and cartridge in an upwardly pivoted position, and an open position wherein the manifold and filter cartridge pivot downwardly from the ceiling. The cover pivots downwardly a greater degree than the manifold and cartridge so as to expose the filter for grasping and removal from the manifold. When the cover is in the closed position, the filter cartridge is at least partially recessed into the ceiling, thereby minimizing the space occupied by the filter assembly in the food compartment. A clip normally retains the cover in the closed position.

BRIEF DESCRIPTION OF THE DRAWINGS

FIG. 6 is a sectional view of the base taken along lines 6—6 of FIG. 5.

FIG. 7 is a sectional view of the base taken along lines 7—7 of FIG. 5.

DETAILED DESCRIPTION OF THE INVENTION

The water filter assembly 10 of the present invention is shown to be mounted in the roof or ceiling 12 of a refrigerator 14. Alternatively, the filter assembly 10 may be mounted in one of the side wall panels 16 of the refrigerator 14, though the preferred location is in the ceiling 12.

Figure 1:
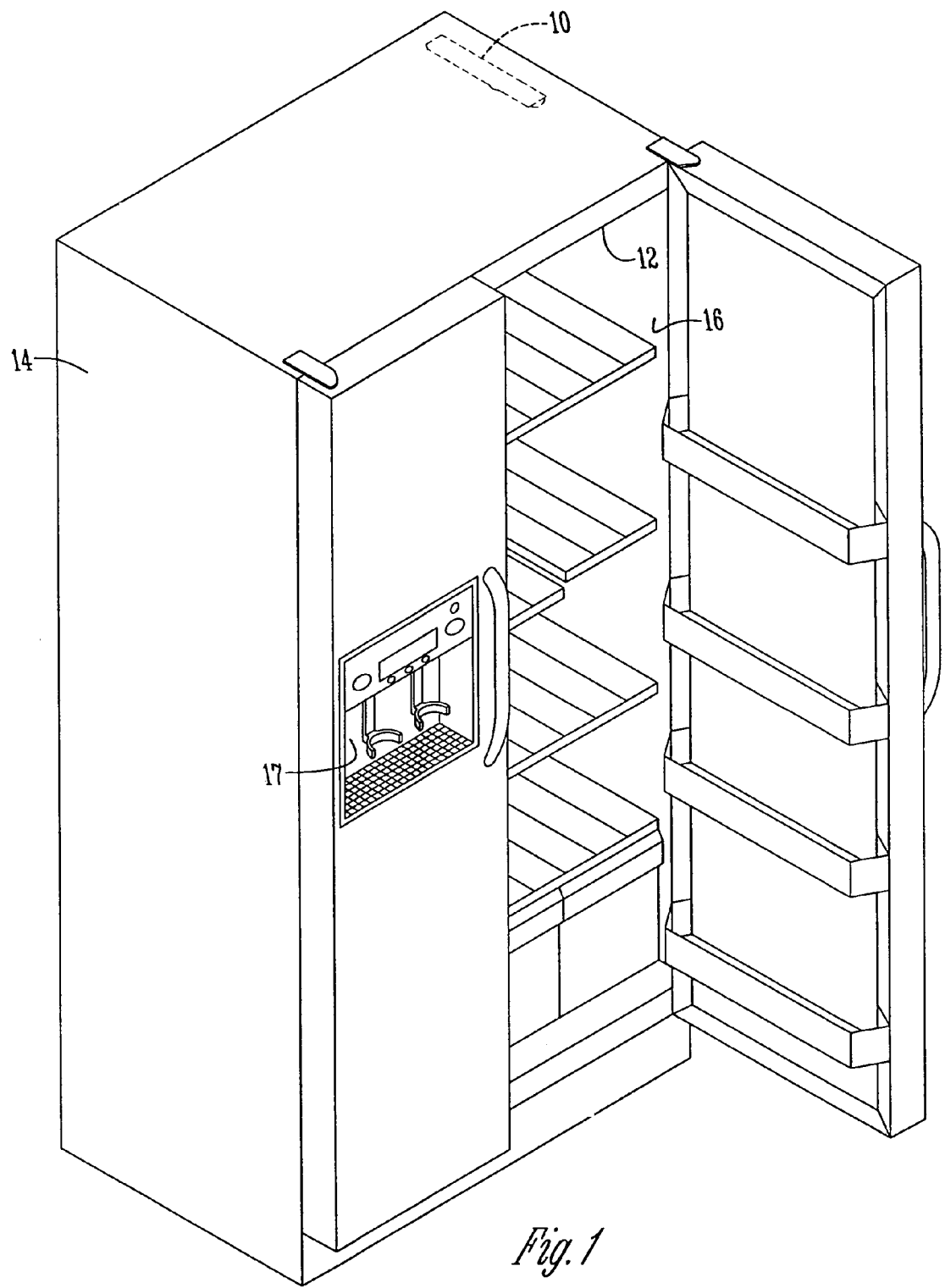
FIG. 1 is a perspective view of a refrigerator illustrating the location of the water filter assembly of the present invention.
Figure 2:
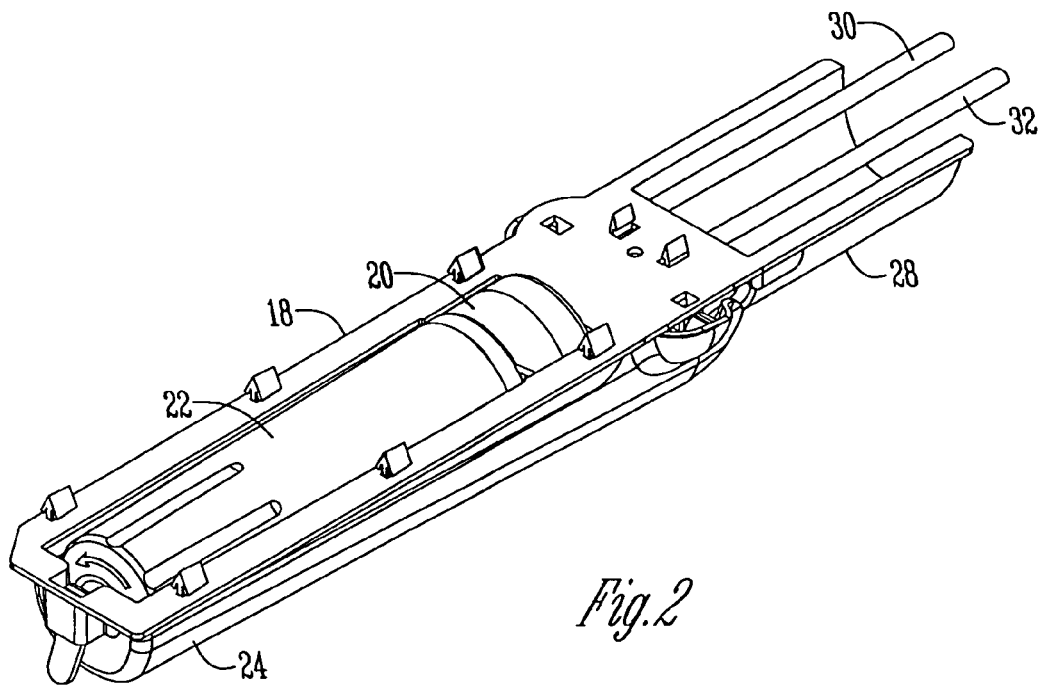
FIG. 2 is a perspective view of the water filter assembly in the closed position.
Figure 3:
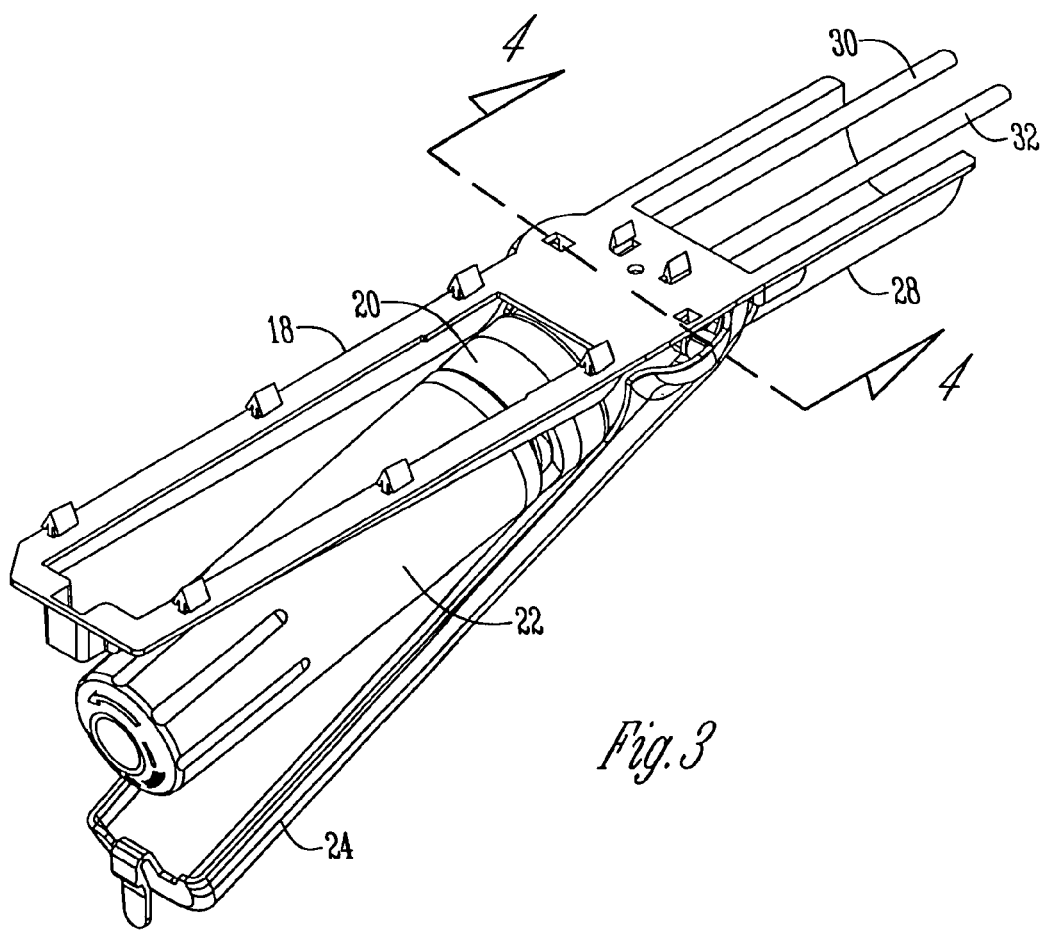
FIG. 3 is a perspective view of the water filter assembly in an open position.

The water filter assembly 10 includes a base 18, a filter manifold 20, a filter cartridge 22, and a cover 24. The manifold 20 and the cover 24 are pivotal. The cover 24 is movable between a closed position, shown in FIG. 2, wherein the manifold 20 and the cartridge 22 are held in a substantially horizontal position, with the cartridge 22 being partially recessed into the ceiling 12, and an open position shown in FIG. 3 wherein the manifold 20, the cartridge 22, and the cover 24 are pivoted downwardly from the base 18 to provide access to the cartridge 22. As seen in FIG. 3, the cover 24 pivots a greater degree than the manifold 20 and the cartridge 22.

The base 18 is adapted to be mounted on the ceiling 12 of the refrigerator 14 through a plurality of clips 26 which are adapted to extend through corresponding holes in the ceiling 12. The base includes a rear housing or tunnel 28 through which water lines 30, 32 extend. The base also includes a collar 34 and a clip 36 opposite one another to pivotally support the manifold 20 as described below. The base 18 also includes an enlarged opening 38 corresponding to the shape of the filter cartridge 22 which allows a portion of the cartridge to extend upwardly through the opening 38 and into a recess in the ceiling 12, when the cover 24 is closed, as best seen in FIG. 2.

Figure 4:
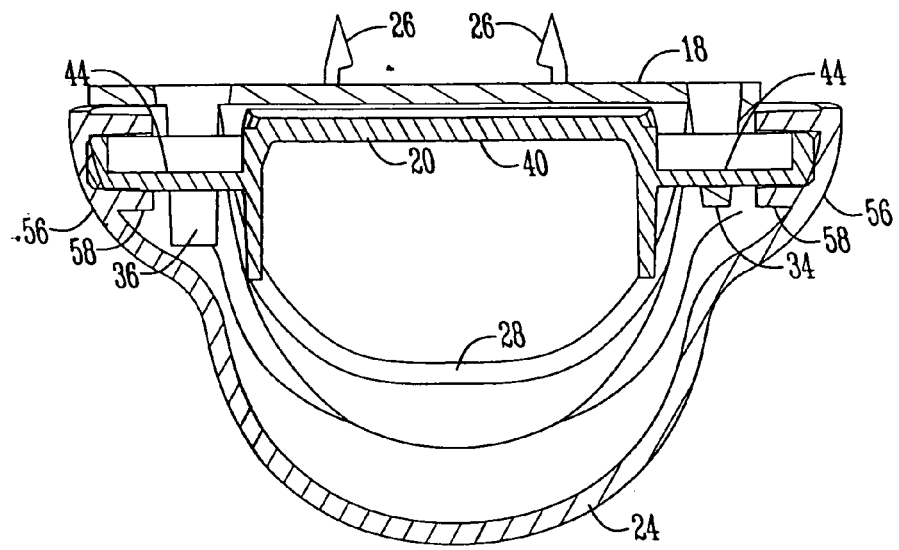
FIG. 4 is a sectional view of the water filter assembly taken along lines 4—4 of FIG. 3.
Figure 5:
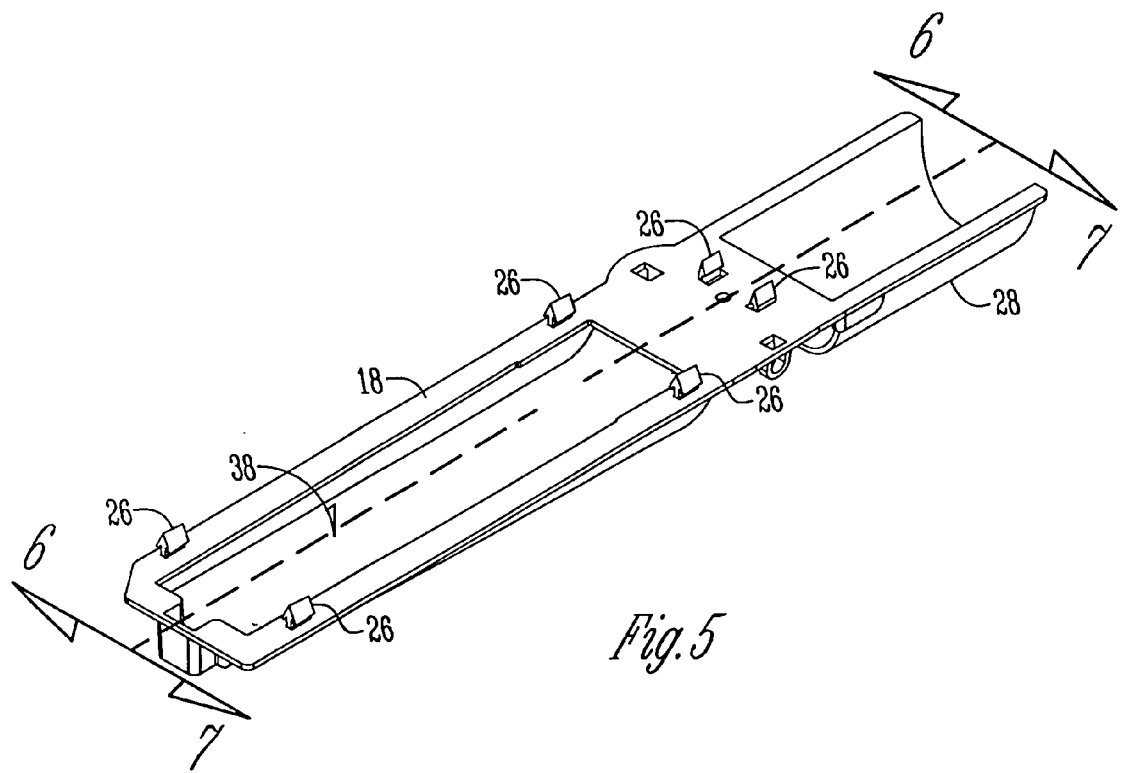
FIG. 5 is a perspective view of the base of the water filter assembly.
Figure 8:
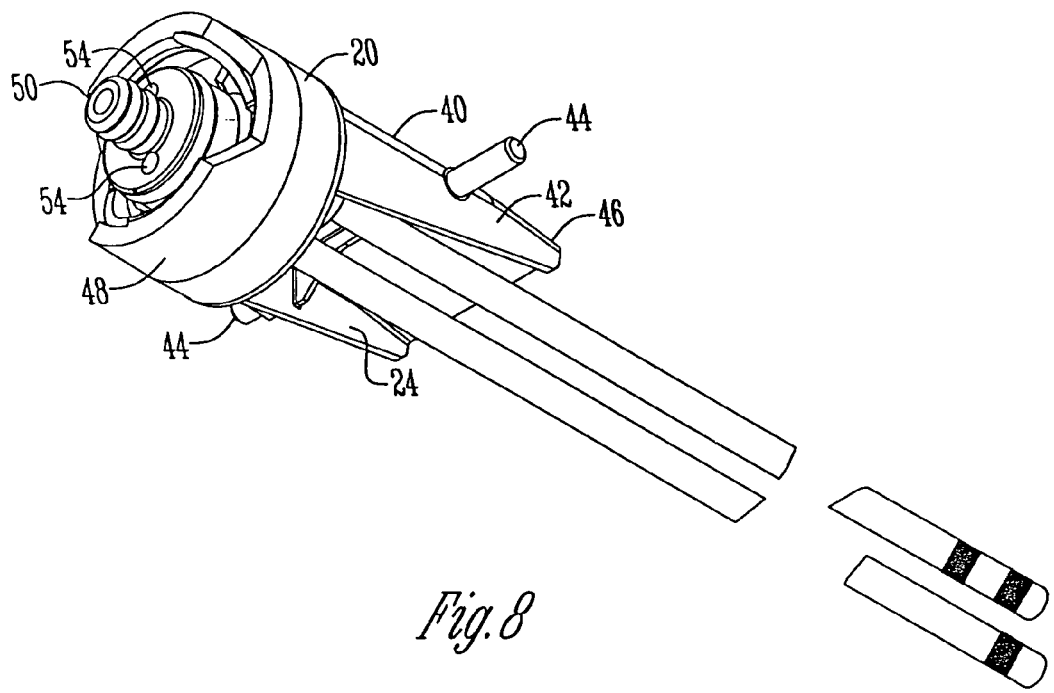
FIG. 8 is a perspective view of the filter manifold of the water filter assembly.
Figure 9:
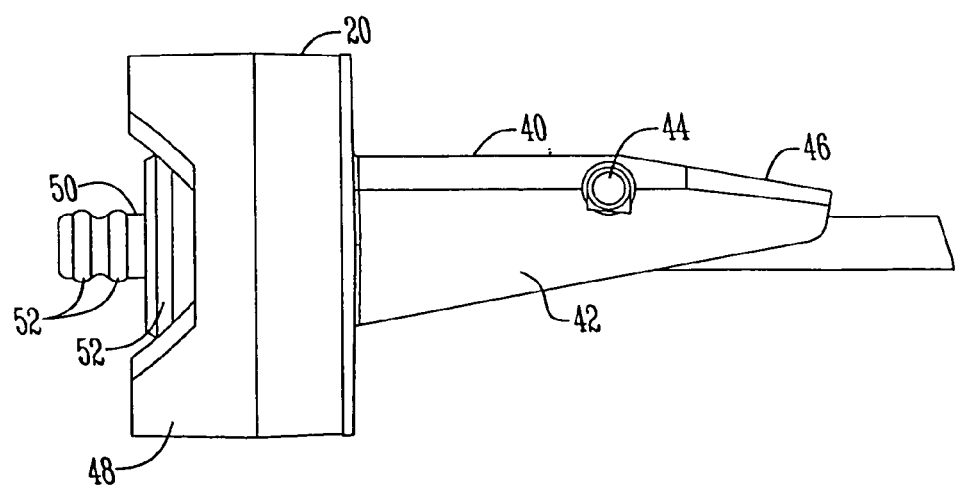
FIG. 9 is a side elevation view of the filter manifold of the water filter assembly.

The manifold 20 is best shown in FIGS. 8 and 9. The manifold 20 includes an upper plate 40 and opposite downwardly extending side plates or wings 42. A pair of pins 44 extend outwardly from each of the wings 42 and define a pivot axis for the manifold 20. The pins 44 of the manifold 22 are adapted to be received in the collar 34 and the clip 36 of the base 18, as shown in FIG. 4, so as to pivotally mount the manifold 22 to the base 18. The upper plate 40 includes a sloped portion 46 angled downwardly and rearwardly from the pivot pins 44.

The manifold 20 also includes a head 48 adapted to threadably receive the cartridge 22. The head 48 includes the female plug 50 which mates with the cartridge 22 in a conventional manner. The plug 50 includes a plurality of O rings 52 to matingly seal with the cartridge 22 and prevent water leakage. Conventional valves 54 are provided in the head 48 so as to provide communication between the water lines 30, 32 when the cartridge 22 is mounted on the head 48 of the manifold 20.

Figure 10:
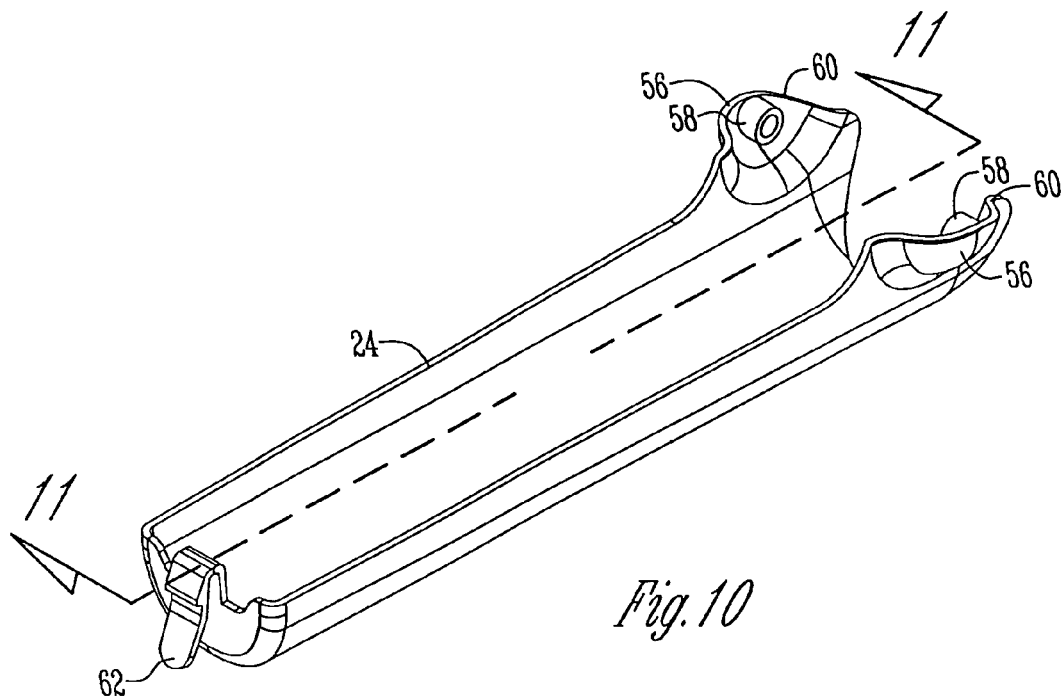
FIG. 10 is a perspective view of the cover of the water filter assembly.
Figure 11:
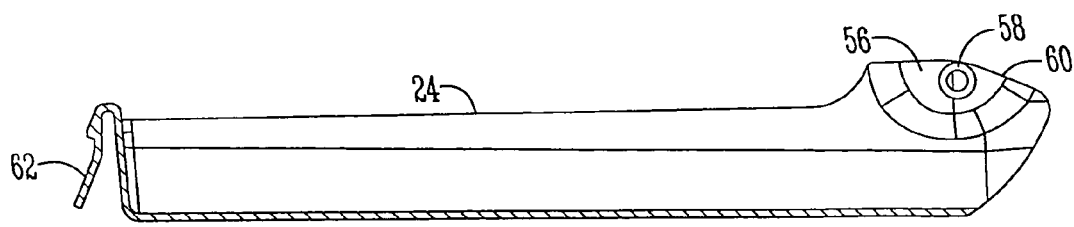
FIG. 11 is a sectional view of the cover taken along lines 11—11 of FIG. 10.

The cover 24 is shown in FIGS. 10 and 11 and is shaped so as to substantially matingly enclose the cartridge 22 when in the closed position. The cover 24 includes opposite flared out portions 56 adjacent the rearward end of the cover 24. Each flared out portion 56 includes an inwardly directed collar 58 which are adapted to receive the pins 44 of the manifold 20 such that the cover 24 is pivotally mounted on the manifold 20. The trailing edge 60 of the flared out portions 56 is tapered or sloped downwardly to permit the cover 24 to pivot relative to the base 18. The angle of the trailing edge 60 relative to a horizontal plane is greater than the angle of the sloped portion 46 of the manifold plate 40, such that the cover 24 pivots a greater amount than the manifold 20 and the cartridge 22, as seen in FIG. 3. A clip 62 is provided on the front end of the cover 24 and is adapted to releasably engage a retention surface 64 on the base 18 to thereby releasably lock the cover 24 in the closed position shown in FIG. 2.

In use, with the cartridge 22 is mounted on the manifold 20, water is supplied through the water line 30 to the filter for treatment, and then returned through the water line 32 for supply to the refrigerator ice maker or water dispenser. When it is time to change the filter, as indicated in any known manner, the clip 62 of the cover 24 is depressed for release from the clip retention surface 64 on the base 18. Upon release of the clip 62, the cover 24, the manifold 20 and the cartridge 22 pivot downwardly by gravity away from the ceiling 12. The cover 24 can be further pivoted to a spaced relation from the cartridge 22, as shown in FIG. 3, so that a person can easily grasp the cartridge 22 and twist the cartridge 22 for disengagement from the manifold head 48. A new cartridge can be installed on the manifold head 48. The cover 24 can then be pushed upwardly until the clip 62 locks on the retention surface 64 of the base 18.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved refrigerator having a fresh food compartment defined by a bottom, side wall panels and a ceiling panel, the improvement comprising:
    a water filter cartridge;
    a manifold for removably receiving the cartridge and being pivotally mounted adjacent one of the panels for movement about a pivot axis substantially parallel to the one panel and adapted to supply water to and receive water from the cartidge via one end of the cartridge;
    a cover pivotally movable between a closed position covering the cartridge and an open position exposing the cartridge; and
    the cover and manifold having a common pivot axis.

2. The improved refrigerator of claim 1 wherein the cartridge is at least partially recessed into the one panel.

3. The improved refrigerator of claim 1 further comprising a clip to releasably retain the cover in the closed position.

4. The improved refrigerator of claim 1 wherein the cover pivots a greater degree than the manifold so as to be spaced from the cartridge when in the open position.

5. The improved refrigerator of claim 1 wherein the pivot axis does not extend through the cartridge.

6. The improved refrigerator of claim 1 wherein the filter cartridge is disposed substantially horizontally when the cover is in the closed position.

7. The improved refrigerator of claim 1 wherein the filter cartridge pivots downwardly by gravity when the cover is opened.

8. A water filter assembly for a refrigerator having a fresh food compartment with a bottom panel, a ceiling panel and sidewall panels, the assembly comprising:
    a manifold pivotally mounted adjacent one of the panels and adapted to supply water to and receive water from a water filter cartridge via one end of the cartridge;
    the water filter cartridge releasably mounted to the manifold so as to reside at least partially in the food compartment;
    a cover mounted within the food compartment and being movable between a closed position wherein the manifold and water filter cartridge are enclosed and an open position wherein the manifold and water filter cartridge are exposed for removal of the water filter cartridge from the manifold;
    the cover and manifold having a common pivot axis wherein upon opening of the cover, the manifold and filter cartridge automatically pivots away from the one panel.

9. The water filter assembly of claim 8 wherein the manifold is pivotally mounted on a base mounted in the one panel.

10. The water filter assembly of claim 9 wherein the manifold and water filter cartridge are pivoted toward the base when the cover is closed and away from the base when the cover is opened.

11. The water filter assembly of claim 8 wherein the cover moves independently of the manifold.

12. The water filter assembly of claim 8 wherein the cover moves independently of the cartridge.

13. The water filter assembly of claim 8 wherein the manifold and filter cartridge pivot downwardly by gravity.

14. The water filter assembly of claim 8 wherein the filter cartridge is disposed substantially horizontally when the cover is in the closed position.

15. A water filter assembly for a refrigerator having a fresh food compartment with a floor, a ceiling and side walls, the assembly comprising:
    a base mounted in the ceiling;
    a manifold pivotally mounted in the base;
    a water filter cartridge releasably mounted to the manifold so as to be oriented substantially horizontally;
    a cover pivotally mounted on the base adjacent the ceiling and sharing a common pivot axis with the manifold for enclosing the water filter cartridge and being moveable between a closed position wherein the manifold and filter cartridge are covered and an open position wherein the cover and manifold pivot downwardly from the ceiling for removal of the filter cartridge from the manifold.

16. The water filter assembly of claim 15 wherein the cartridge is partially recessed into the ceiling.

17. The water filter assembly of claim 15 further comprising a clip to retain the cover in the closed position.

* * * * *